Patented Dec. 29, 1931

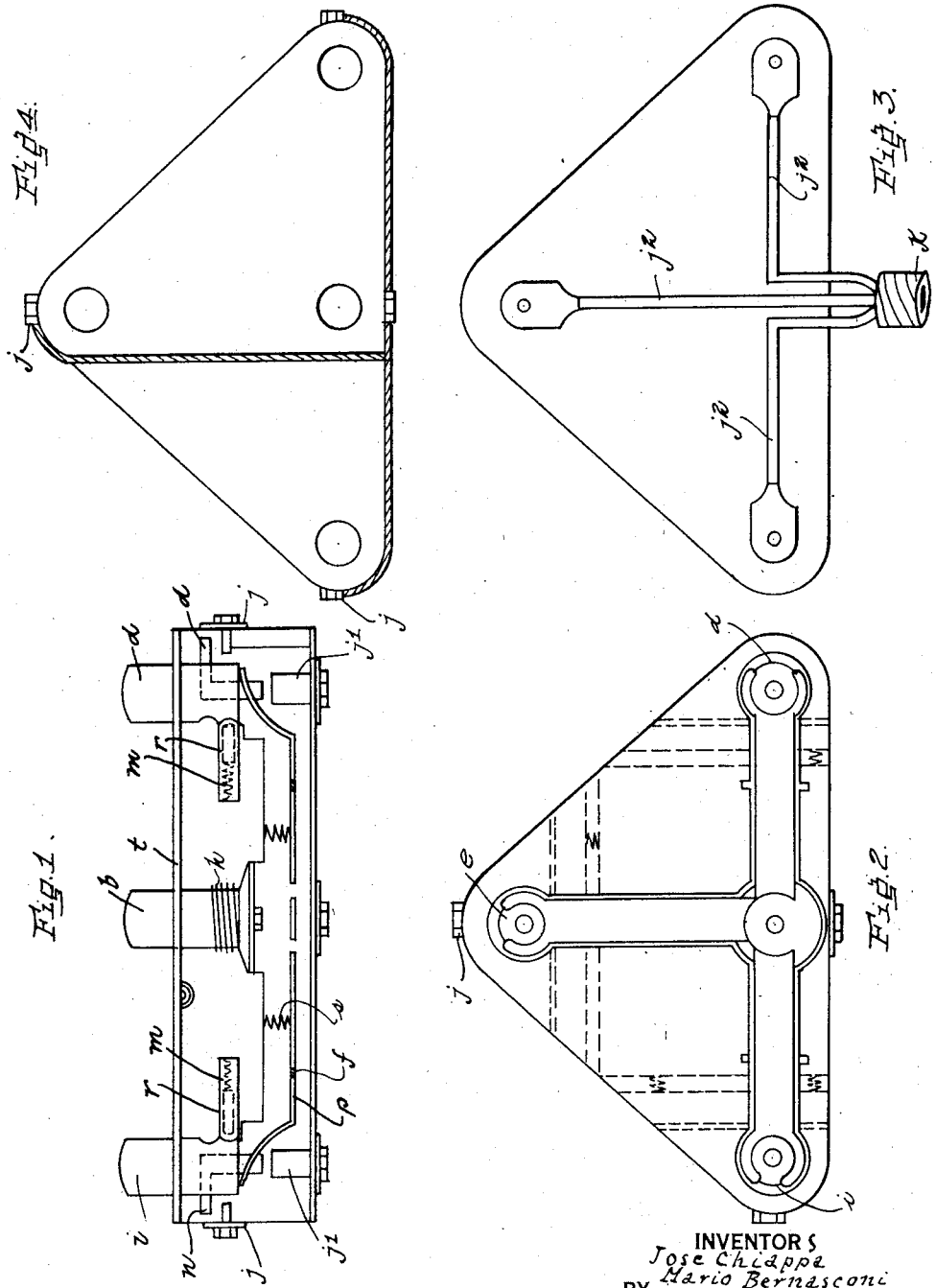

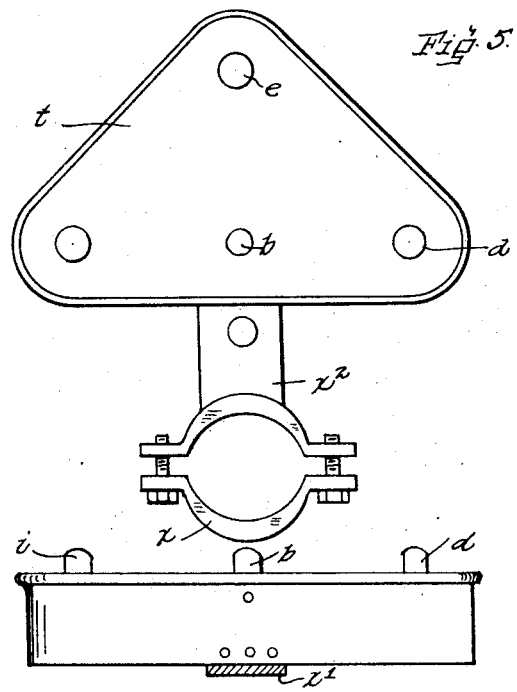
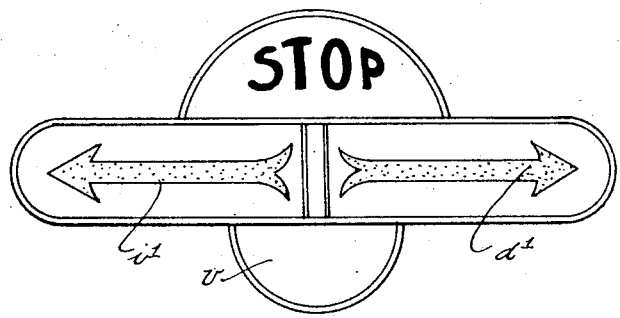
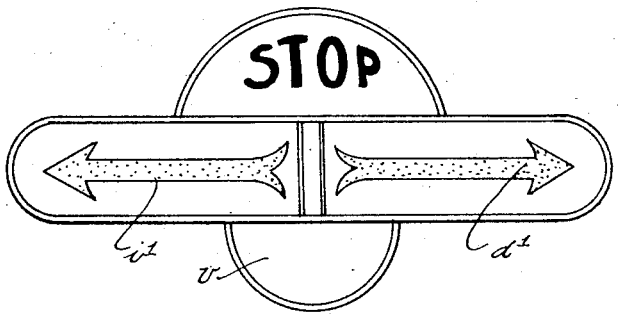
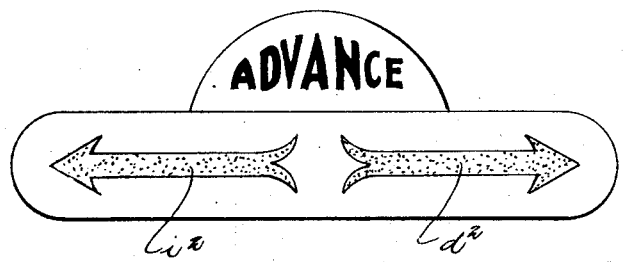

1,838,742

UNITED STATES PATENT OFFICE

JOSE CHIAPPA AND MARIO BERNASCONI, OF BUENOS AIRES, ARGENTINA

KEYBOARD DEVICE FOR ILLUMINATING LUMINOUS SIGNALS FOR MOTOR CARS, MOTOR TRUCKS, AND OTHER SIMILAR VEHICLES

Application filed September 14, 1929, Serial No. 392,658, and in Argentina June 11, 1929.

Our invention refers to a new keyboard device for illuminating luminous signals for motor cars, motor trucks, and other similar vehicles, by the use of which notable advantages are obtained, inasmuch as in the construction of same, a point that has been borne in mind has been the ease and comfort for the driver of any mechanically driven vehicle, and we have eliminated the system of having to employ levers or pedals, which necessitate having to execute uncomfortable and uneasy movements, which in some cases can be usefully made use of in the manœuvres of the vehicle. With the present invention, all the inconveniences mentioned are eliminated, as the simple pressure of a finger applied to the keyboard device is sufficient to illuminate the required signal, be such "Right", "Left", "Stop" or "Advance" if it is desired, one of the novelties of the present invention being the placing of a luminous signal on the front part of the vehicle to indicate, principally to the officials directing the traffic, the manœuvre which is about to be executed or initiated.

In the present known devices, the driver can only illuminate the signal "Stop" when he has effected the manœuvre of stopping, which is inconvenient for the vehicle behind as its driver can only be aware of this fact when he is in close proximity to the preceding vehicle, a difficulty which is overcome with our device, inasmuch as the signal "Stop", as similarly the others, can be made at any moment, independently of the travelling or immobility of the vehicle.

In order that our application may be more clearly understood, we have illustrated same with various figures, in which:

Fig. 1 is an internal lateral view of the device, without its casing or box.

Fig. 2 is a plan view of the lower part, without its casing or box.

Fig. 3 is a view of the disposition of the cables which conduct the current to the signals or lamps.

Fig. 4 is a view of the top part of the device showing the distribution of the cables which feed the current to the indicator.

Fig. 5 is a plan view of the apparatus with its casing or box.

Fig. 6 is a side view of Fig. 5.

Fig. 7 is a view of the lamp or luminous signal applicable to the rear part of the vehicle.

Fig. 8 is a view of the lamp or luminous signal for the front part of the vehicle.

Construction

The construction comprises essentially three buttons or keys which on being put in action connect to cables for illuminating the respective signals, and a button which on being pressed disconnects all connections produced by the ones previously mentioned, all parts returning to their primitive positions.

The buttons $(i)$, $(d)$ are of similar execution, and their position is symmetrical, serving to illuminate the signal "Left" or "Right", respectively. The Fig. 1 shows clearly the construction. The said buttons $(i)$, $(d)$ pass through the cover of the casing or box $(t)$ and are retained by the butts $(r)$ which exert pressure by means of the springs $(m)$ in the grooves which are provided in said buttons, which are provided with right-angle contacts $(n)$ and impelled in an upward direction by the levers $(p)$ which exert pressure by means of the springs $(s)$, and are supported at $(f)$.

The third button or key $(e)$, Fig. 2, is of the same system and construction, and is placed at the vertex of the triangle forming the present device, which may be nevertheless of any other desired form without departing for this reason from the sphere of the invention.

The disconnecting button $(b)$ is positioned at the base of the triangle mentioned, between the two buttons $(i)$, $(d)$, supported and always pressed upwardly by the spring $(h)$, and by means of a slight pressure touches the levers $(p)$ when it is desired, returning immediately to its primitive position on the pressure being withdrawn.

The electric current for the working of the device enters by points $(j)$, Figs. 1, 2, and 4 and leaves by the cables $(j^2)$, which joined in a flexible tube $(k)$ again separate at a certain distance to make connection with the corresponding signal.

The luminous signals or lamps are shown in Figs. 7 and 8.

The Fig. 7 is a lamp or signal positioned in the rear part of the vehicle. It is provided with transparent signals executed by means of any known or convenient system.

In the present drawings two arrows ($i'$), ($d'$) are shown, indicating "Left" and "Right" and the upper sign "Stop", and in the lower part the reglementary lamp ($v$).

The Fig. 8 shows the signal for the front part of a vehicle, in which the signal "Advance" may be added or suppressed as desired.

Working

The working of the device is quite simple; once it has been fixed to the staff of a steering wheel, by means of the screw-nut ($x$), Fig. 5, the four buttons will always be within easy reach of the driver. When the latter desires to turn towards the left, he will simply press the button ($i$), Figs. 1, 2 and 5, which being released from its lower groove, directs itself in a downward direction producing contact by means of its angle ($n$) with the point of entrance ($j$) and the butt ($j'$), producing the current which will illuminate the signal ($i'$) and ($i^2$) of the tail and head lamps, remaining in said position owing to the second groove, into which penetrates the butt ($r$) and continues always in contact; in order that it may return to its original or normal position, the disconnecting button ($b$) is pressed, which will exert pressure on the end of lever ($p$), and the latter will push the button ($i$) in an upward direction and cut off the connection instantaneously, suppressing the illumination in its respective signal. For the signal for the "Right" turn, the operation is identical to that described, and the same procedure is followed for the signal to "Stop", it being sufficient to press the button ($e$) in this case, and if it should be desired, there may be added to the front lamp a signal with the word "Advance", Fig. 8, or any other similar, the characteristic feature of the present invention being the combination of the rear signals with the front ones and the signal to stop or advance by means of buttons or keys, as may be desired and at any moment, be the vehicle stationary or travelling.

The electric current for the working of what has already been described, as also the material employed in the manufacture of the various parts, may be any that is adapted to the functions to be performed.

Having now particularly described and determined the nature of our invention, and the manner in which it is carried out in practice, we declare that what we claim as our exclusive right and property is: "a new keyboard device for illuminating luminous signals for motor cars, motor trucks, and other similar vehicles", constituted:

1. A selective switch for vehicle signals including a signal circuit, a casing, a perforated cover for said casing, push buttons entering said casing through the perforations in its cover, each having two grooves formed therein, angular contact rails on said buttons, spring controlled levers normally keeping said buttons partly extended from said casing allowing a depression of said buttons into said casing, means for locking the buttons in their extended and depressed positions, supports for said levers, contacts in the signal circuit adapted to be engaged by the contact rails of said buttons to close the signal circuit, and a means for operating said levers to carry the buttons back into their normal position extended from said casing after each operation.

2. A selective switch for vehicle signals including an electric signal circuit, comprising a casing, a perforated cover for said casing, three push buttons extending into said casing through the perforations of its cover, each button having two superposed grooves, angular contact rails on said buttons, spring controlled levers normally keeping said buttons partly projecting from said casing, latches entering the grooves in said buttons, springs for normally keeping said latches in engagement with the grooves of said buttons allowing an inward pressing of said buttons, spring pressed levers for normally keeping said buttons in their extended position, contacts within the signal circuit adapted to be engaged by said contact rails of the buttons to allow the closure of the signal circuit, and, a spring controlled button engaging the levers at their inner ends to allow their outer ends to push the buttons back into their normal extended position, said latches engaging one of the grooves on the buttons in their depressed and extended position to lock the same in either position.

In testimony whereof, we affix our signatures.

JOSE CHIAPPA.
MARIO BERNASCONI.